US010182681B1

(12) United States Patent
Hart et al.

(10) Patent No.: US 10,182,681 B1
(45) Date of Patent: Jan. 22, 2019

(54) FILLABLE BAKED GOODS VESSEL WITH OPTIONAL PLUG, AND METHOD

(71) Applicant: CREATE YOUR CUPCAKE, LLC, Atlanta, GA (US)

(72) Inventors: Barbara Sherwin Hart, Atlanta, GA (US); Kenneth G. Kerdell, Lawrenceville, GA (US)

(73) Assignee: Barbara Sherwin Hart, Atlanta, GA (US)

( * ) Notice: Subject to any disclaimer, the term of this patent is extended or adjusted under 35 U.S.C. 154(b) by 288 days.

(21) Appl. No.: 15/339,310

(22) Filed: Oct. 31, 2016

Related U.S. Application Data

(60) Provisional application No. 62/248,172, filed on Oct. 29, 2015.

(51) Int. Cl.
| | |
|---|---|
| *A21B 3/13* | (2006.01) |
| *A47J 37/01* | (2006.01) |
| *B65D 21/02* | (2006.01) |
| *B65D 1/34* | (2006.01) |
| *B65D 25/10* | (2006.01) |
| *B65D 25/24* | (2006.01) |
| *A21D 13/00* | (2017.01) |
| *A47J 43/20* | (2006.01) |
| *A23G 1/00* | (2006.01) |

(Continued)

(52) U.S. Cl.
CPC ............. *A47J 37/01* (2013.01); *A21B 3/132* (2013.01); *A21B 3/139* (2013.01); *A21B 5/026* (2013.01); *A21D 8/06* (2013.01); *A21D 13/0025* (2013.01); *A21D 13/33* (2017.01); *A23G 1/0063* (2013.01); *A23G 1/0076* (2013.01); *A23G 1/205* (2013.01); *A23G 3/0029* (2013.01); *A23G 3/0263* (2013.01); *A23G 9/083* (2013.01); *A23G 9/221* (2013.01); *A23P 30/10* (2016.08); *A47J 43/20* (2013.01); *B65D 1/34* (2013.01); *B65D 21/0233* (2013.01); *B65D 25/108* (2013.01); *B65D 25/24* (2013.01)

(58) Field of Classification Search
CPC .. A47J 43/20; A47J 37/01; A21B 3/13–3/139; A21B 3/132; A21B 5/026; A21D 13/33; A21D 8/06; A23P 30/10; A23G 1/0063–1/0073; A23G 1/0076; A23G 1/21; A23G 9/221; A23G 1/205; A23G 3/0029; A23G 3/0263; A23G 9/083; A23G 9/506; A23G 2220/14; A23G 2220/22; B65D 25/24; B65D 1/34; B65D 21/0233; B65D 25/108
See application file for complete search history.

(56) References Cited

U.S. PATENT DOCUMENTS

| | | | | |
|---|---|---|---|---|
| 1,510,279 A | * | 9/1924 | Huth ...................... | A21B 3/132 249/DIG. 1 |
| 1,543,221 A | * | 6/1925 | Matson .................. | A21B 5/023 99/383 |

(Continued)

*Primary Examiner* — Drew E Becker
(74) *Attorney, Agent, or Firm* — Barnes & Thornburg LLP; Jason Bernstein

(57) ABSTRACT

Apparatus, systems, and methods for forming baked goods having a filling recess for receiving a filling by a baking assembly including a base tray receiving at least one batter cup each cup defining a batter cavity therein. A cavity cup tray is nested with the base tray and receives at least one cavity cup for positioning within the corresponding batter cavity to form the filling recesses.

21 Claims, 9 Drawing Sheets

(51) Int. Cl.
*A23G 3/34* (2006.01)
*A21D 8/06* (2006.01)
*A21D 13/33* (2017.01)
*A21B 5/02* (2006.01)
*A23G 1/20* (2006.01)
*A23P 30/10* (2016.01)
*A23G 3/02* (2006.01)
*A23G 9/22* (2006.01)
*A23G 9/08* (2006.01)

(56) References Cited

U.S. PATENT DOCUMENTS

| | | | |
|---|---|---|---|
| 1,831,147 A | 11/1931 | Smith | |
| 1,906,640 A * | 5/1933 | Shivek | A21B 5/026 425/422 |
| 1,970,712 A * | 8/1934 | Snodgrass | A23G 9/221 249/108 |
| 2,145,696 A * | 1/1939 | Overland | A23G 9/286 425/438 |
| 2,186,699 A | 1/1940 | Jackson | |
| 2,500,006 A * | 3/1950 | Overland | A23G 9/221 249/119 |
| 2,549,915 A * | 4/1951 | McCarl | A23G 9/26 249/93 |
| 2,619,046 A * | 11/1952 | Henderson | A23G 9/083 249/120 |
| 3,296,956 A | 1/1967 | Turner | |
| 3,385,205 A * | 5/1968 | McCloud | A21B 3/132 249/121 |
| 3,831,507 A | 8/1974 | Wheaton | |
| 4,653,392 A | 3/1987 | Gerber | |
| 4,694,961 A * | 9/1987 | Menendez | A21B 3/132 206/508 |
| 5,191,830 A | 3/1993 | Jacobson | |
| 5,226,352 A | 7/1993 | Savage | |
| 5,425,527 A | 6/1995 | Selbak | |
| 6,827,324 B1 | 12/2004 | Yother | |
| 7,008,655 B1 | 3/2006 | Aslanis | |
| 7,150,221 B2 | 12/2006 | Morgan | |
| 2005/0005779 A1 | 1/2005 | Morgan | |
| 2005/0247212 A1* | 11/2005 | Meeks | A21B 3/136 99/426 |
| 2007/0031554 A1* | 2/2007 | Brandt | A21B 3/139 426/505 |
| 2008/0072769 A1* | 3/2008 | Hecker | A21B 3/132 99/426 |
| 2012/0073451 A1 | 3/2012 | Davison, III et al. | |
| 2013/0189410 A1 | 7/2013 | Braden | |
| 2013/0341335 A1 | 12/2013 | Sitabkhan et al. | |

* cited by examiner

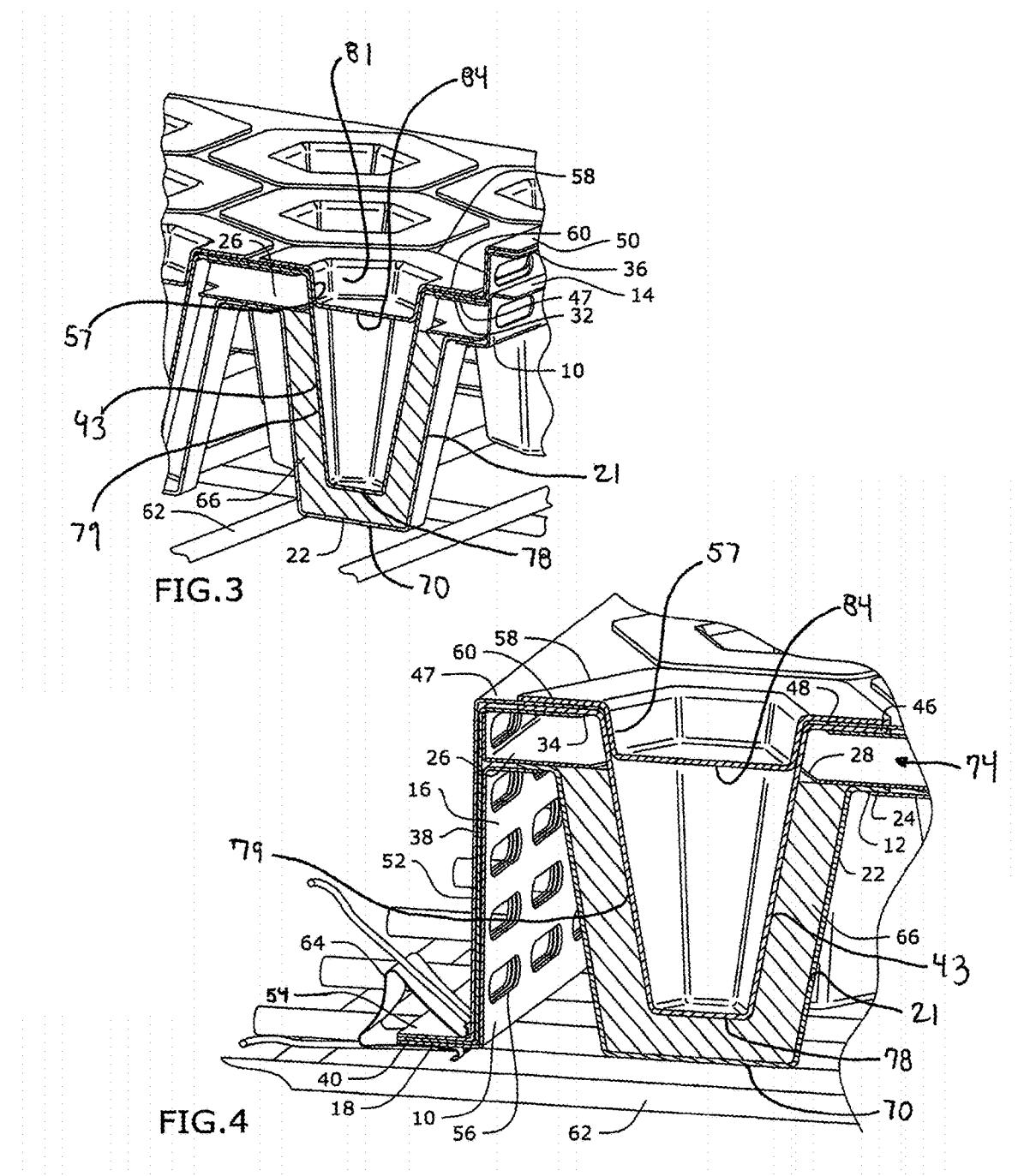

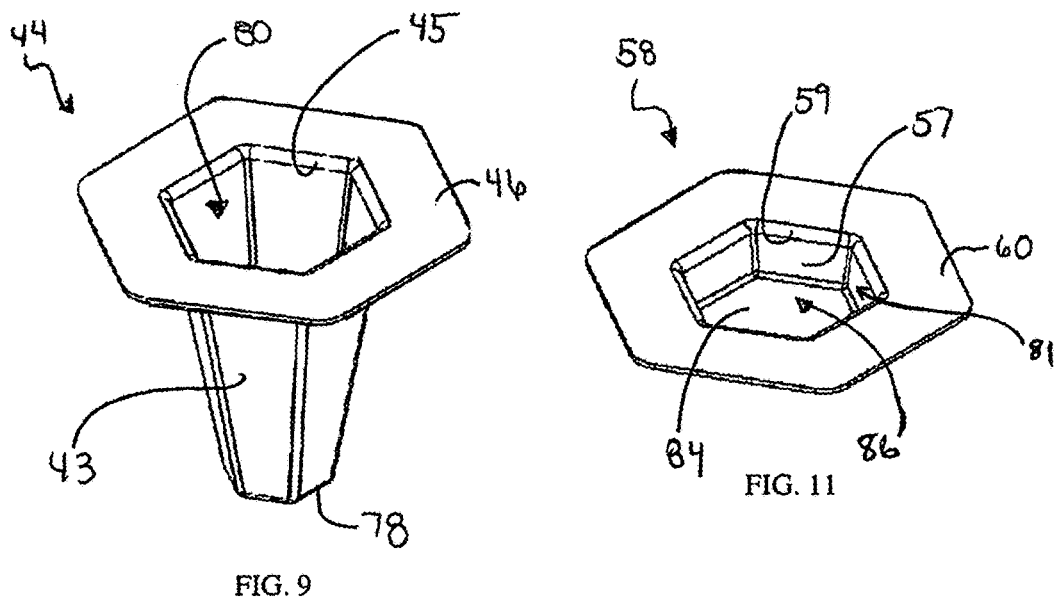
FIG. 9
FIG. 11
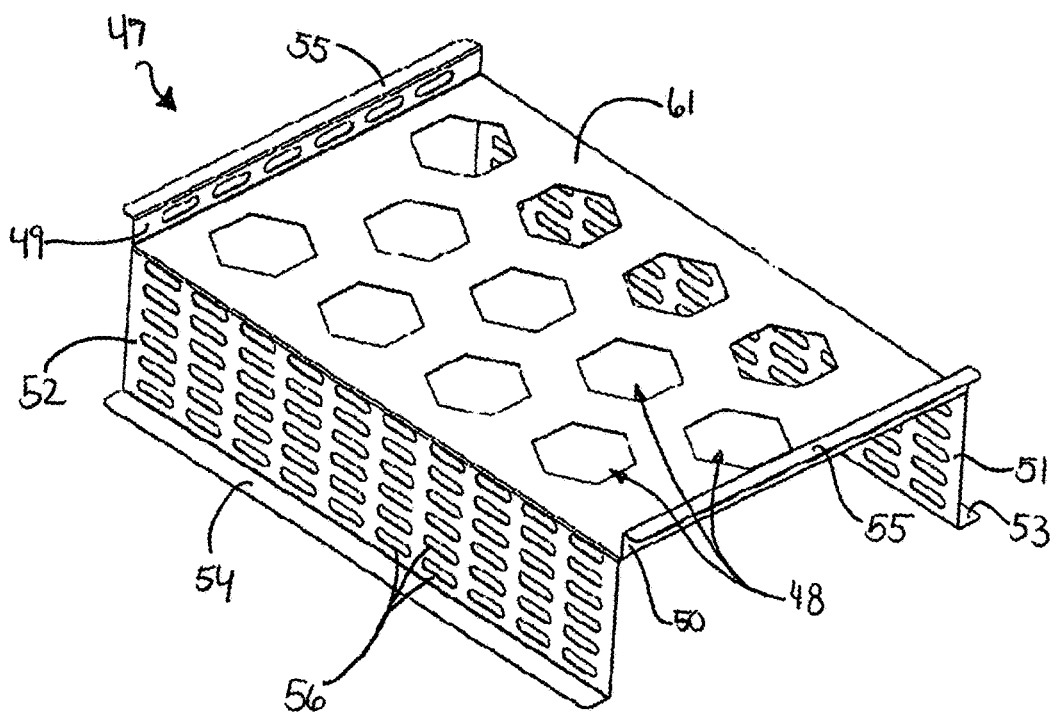
FIG. 10

FILLABLE BAKED GOODS VESSEL WITH OPTIONAL PLUG, AND METHOD

CROSS-REFERENCE TO RELATED APPLICATION

This application claims benefit of U.S. provisional patent application 62/248,172, filed Oct. 29, 2015, entitled "FILLABLE BAKED GOODS VESSEL WITH OPTIONAL PLUG, ARTICLE FORMED AND METHOD OF MAKING A FILLABLE BAKED GOOD", and commonly assigned to the assignee of the present application, the disclosure of which is incorporated by reference in its entirety herein.

FIELD

The present disclosure relates generally to bakeware. More specifically, the disclosure relates, in exemplary embodiments, to bakeware that can be used to produce customizable, hollow or fillable baked goods in various shapes and designs.

BACKGROUND

Bakeware is known having a variety of shapes and sizes for cooking and baking different food items. Baking pans, such as cupcake pans, receive batter to create baked goods having a desired shape and size. Baking pans for cupcakes, muffins and breadstuff typically do not have a method for baking in a hollow center for fillings. There is typically no easy and efficient way for a commercial baker to put a filling within one of the baked goods. Instead, the filling is either mixed with the batter before baking or is placed in the baked good after baking. If the filling is mixed with the batter, there is no mechanism to hold the filling in a particular position relative to the batter. As such, the filling may float around in the batter and end up protruding from the bottom, side, or top of the baked good. Adding the filling after baking can be a time-consuming process that requires the baker to carve or cut out a portion of the baked good and carefully insert the filling by hand. The carve out process further requires piercing the surface of the baked good, which is undesirable.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

According to one aspect of the present disclosure, a baking assembly for forming baked goods having a filling recess for receiving filling may include at least one batter cup including a body and a rim projecting from the body, the body having a cavity defined therein for receiving batter; a base tray (also referred to as a lower tray) having at least one opening for receiving the body of the at least one batter cup; at least one cavity cup including a cavity cup body arranged within the cavity of the batter cup and a flange projecting from the cavity cup body; a cavity cup tray (also referred to as a middle tray) including at least one aperture adapted to receive the at least one cavity cup arranged within the cavity of the batter cup spaced apart from the body of the batter cup to define a batter space between the cavity cup body and the body of the batter cup, the cavity cup tray nested above the base tray to align the at least one aperture with the at least one opening; and, an upper tray including at least one opening, the upper tray abutting the cavity cup tray with alignment between the at least one opening and the at least one aperture of the cavity cup tray. The rim of the at least one batter cup may engage the base tray to seat the at least one batter cup within the at least one opening of the base tray, and the flange of the cavity cup engages the cavity cup tray to seat the at least one cavity cup within the at least one aperture of the cavity cup tray.

In exemplary embodiments, the baking assembly may include at least one plug each including a plug body and a plug flange extending from the plug body, wherein a plurality of plugs may be arranged within a plurality of openings of the upper tray to abut the plug flange with the upper tray. In exemplary embodiments, the plug body may define a plug cavity for receiving batter to form a topper to be received over the filling recess of baked goods, the plug cavity shaped complementary to the cavity cup body.

In exemplary embodiments, the baking assembly may include a spacer tray arranged between the base tray and the cavity cup tray to support the cavity cup tray spaced apart from the base tray to define a gap between a tray body of the base tray and a tray body of the cavity cup tray. In exemplary embodiments, the spacer tray may include a tray body that abuts the rim of the at least one cavity cup. In some embodiments, the spacer tray may include at least one cutout aligned with the at least one opening of the base tray to receive the cavity cup. In some embodiments, the spacer tray may include a tray body that extends at least partially radially between the batter cup and the cavity cup to define the at least one cutout and the tray body form a barrier for batter within batter cups.

In exemplary embodiments, the base tray may include a tray body defining the at least one opening and at least two legs (also referred to as rails) each extending generally downward from the tray body, each forming a foot or support for supporting the tray body above the feet. In some embodiments, a flange may extend from each foot to provide stability of the corresponding leg.

In exemplary embodiments, the cavity cup tray may include a tray body defining the at least one aperture and at least two legs each extending generally downward from the tray body to form a foot for supporting the tray body above the feet. In some embodiments, the feet of the cavity cup tray may engage with the base tray and may support the tray body of the cavity cup tray spaced apart from the tray body of the base tray. In some embodiments, the legs of the cavity cup tray may extend over the legs of the base tray to nest the cavity cup tray and the base tray together.

In exemplary embodiments, the legs of the base tray may include at least one vent opening defined therethrough for allowing air to flow around the batter cups. In some embodiments, the cavity cup tray may include at least one vent opening defined therethrough, the at least one vent opening of the cavity cup tray arranged to correspond with at least one vent opening of the base tray.

In exemplary embodiments, the base tray may include at least two arms extending generally upward from the tray body to provide support for the cavity cup tray. The base tray and the cavity cup tray include a tray body and rails extending generally upward from the respective tray body, each of the rails including a flange that provides a support surface.

According to another aspect of the present disclosure, a method of assembling a baking assembly for forming baked goods having a filling recess for receiving filling may include receiving at least one batter cup within at least one opening of a base tray such that a rim of the at least one batter cup abuts against a tray body of the base tray, depositing batter within a cavity of the at least one batter cup, mounting a cavity cup tray with the base tray such that at least one opening of the cavity cup tray is aligned with the cavity of the at least one batter cup and such that the tray body of the base tray is spaced apart from a tray body of the cavity cup tray, receiving at least one cavity cup within the at least one opening of the cavity cup tray and into the cavity of the batter cup such that a rim of the at least one batter cup abuts against the tray body of the cavity cup tray, and mounting an upper tray above the cavity cup tray.

In exemplary embodiments, mounting e cavity cup tray with the base tray may include mounting lower rails of the cavity cup tray to nest over lower rails of the base tray.

In exemplary embodiments, the method may include receiving at least one plug within a corresponding at least one opening of the upper tray. In some embodiments, the method may include filling a cavity of each plug with batter to form a topper for covering the filling recess of the baked goods. In some embodiments, the method may include mounting a spacer tray with the base tray to abut a rim of the at least one batter cup.

According to another aspect of the present disclosure, a vessel for forming baked goods may include a lower tray having at least one opening, at least one batter cup removably receivable in the at least one opening, a spacer tray, a middle tray, at least one cavity cup configured to be nestingly receivable by the middle tray, and, an upper tray.

According to another aspect of the present disclosure, a method of baking a baked good having a filling recess for receiving filling may include assembling a baking assembly, including receiving at least one batter cup within at least one opening of a base tray such that a rim of the at least one batter cup abuts against a tray body of the base tray, depositing batter within a cavity of the at least one batter cup, mounting a cavity cup tray with the base tray such that at least one opening of the cavity cup tray is aligned with the cavity of the at least one batter cup and such that the tray body of the base tray is spaced apart from a tray body of the cavity cup tray, receiving at least one cavity cup within the at least one opening of the cavity cup tray and into the cavity of the batter cup such that a rim of the at least one batter cup abuts against the tray body of the cavity cup tray, and mounting an upper tray above the cavity cup tray; heating the baking assembly to convert at least a portion of the batter at least partially into the baked good; and cooling at least a portion of the at least partially formed baked good.

According to another aspect of the present disclosure, a baked good having a filling recess formed by a method of baking may include assembling a baking assembly, including receiving at least one batter cup within at least one opening of a base tray such that a rim of the at least one batter cup abuts against a tray body of the base tray, depositing batter within a cavity of the at least one batter cup, mounting a cavity cup tray with the base tray such that at least one opening of the cavity cup tray is aligned with the cavity of the at least one batter cup and such that the tray body of the base tray is spaced apart from a tray body of the cavity cup tray, receiving at least one cavity cup within the at least one opening of the cavity cup tray and into the cavity of the batter cup such that a rim of the at least one batter cup abuts against the tray body of the cavity cup tray, and mounting an upper tray above the cavity cup tray; heating the baking assembly to convert at least a portion of the batter into the baked good; and cooling at least a portion of the baked good.

Additional features alone or in combination with any other feature(s), including those listed above and those listed in the claims and those described in detail below, can comprise patentable subject matter. Others will become apparent to those skilled in the art upon consideration of the following detailed description of illustrative embodiments exemplifying the best mode of carrying out the invention as presently perceived.

BRIEF DESCRIPTION OF THE DRAWINGS

The drawings disclose exemplary embodiments in which like reference characters designate the same or similar parts throughout the figures of which:

FIG. 3 is a partial cross-sectional view of an individual baking container of the baked goods vessel taken along the line 3-3 in FIG. 1.

FIG. 4 is a cross-sectional view of an individual baking container of the baked goods vessel taken along the line 4-4 in FIG. 1.

FIG. 9 is a perspective view of a cavity cup of the baked goods vessel of FIG. 1.

FIG. 10 is a perspective view of a upper tray of the baked goods vessel of FIG. 1.

FIG. 11 is a perspective view of an optional filling plug of the baked goods vessel of FIG. 1.

FIGS. 12A-12F illustrate an exemplary embodiment of an assembly of the baked goods vessel of FIG. 1, wherein:

FIG. 12A is a perspective view of a portion of the baked goods vessel of FIG. 1 in a first assembly position, illustrating batter cups are received within corresponding cutouts within the lower tray;

FIG. 12B is a perspective view of a portion of the baked goods vessel of FIG. 1 in a second assembly position, illustrating a spacer tray is received on top of the batter cups received within corresponding cutouts within the lower tray;

FIG. 12C is a perspective view of a portion of the baked goods vessel of FIG. 1 in a third assembly position, illustrating a middle tray is received on top of the spacer tray;

FIG. 12D is perspective view of a portion of the baked goods vessel of FIG. 1 in a fourth assembly position, illustrating cavity cups are received within corresponding cutouts within the middle tray;

FIG. 12E is a perspective view of a portion of the baked goods vessel of FIG. 1 in a fifth assembly position, illustrating a upper tray is received on top of the cavity cups received within corresponding cutouts within the middle tray; and FIG. 12F is a perspective view of a portion of the baked goods vessel of FIG. 1 in a sixth assembly position, illustrating optional filling plugs are received through corresponding cutouts within the upper tray.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "upper", "middle", "lower", "horizontal", "vertical", "left", "right", "up" and "down", as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The description that follows includes exemplary apparatus, methods, and operational sequences of the present invention. However, it is understood that the described embodiments may be practiced without these specific details.

Figure 1:
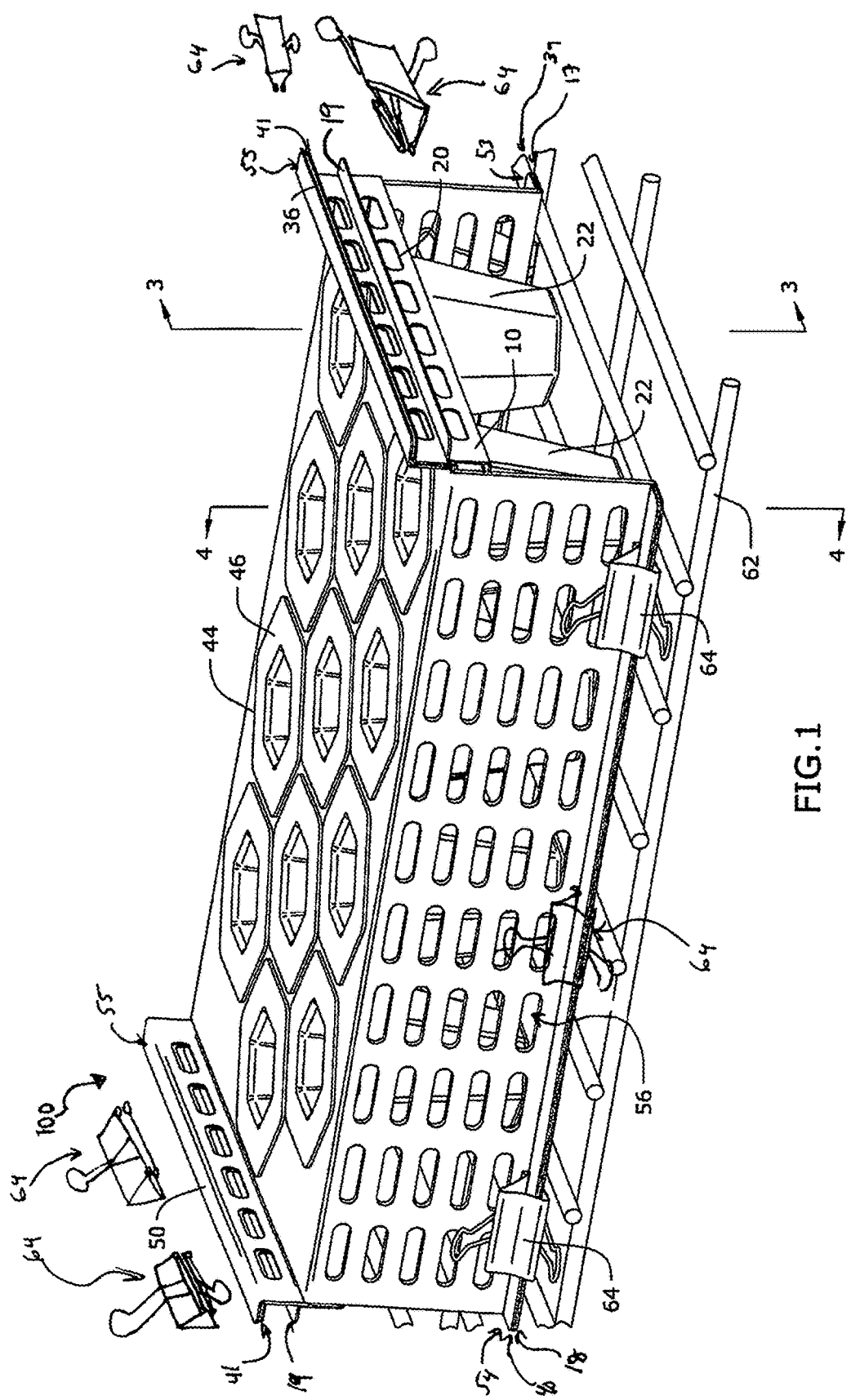
FIG. 1 is a perspective view of a baked goods vessel of the present disclosure as received on a rack in an oven or other baking apparatus.
Figure 2:
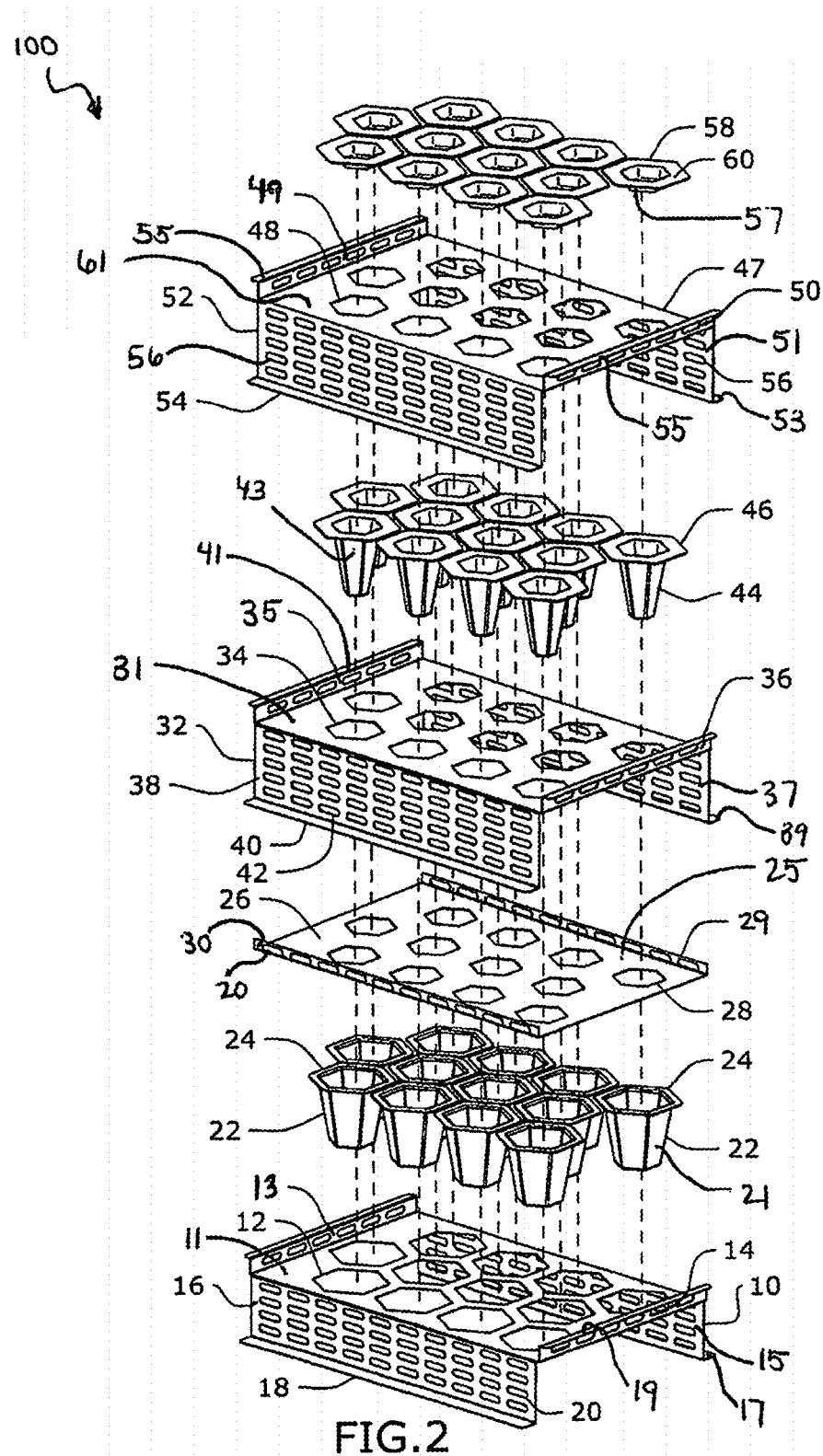
FIG. 2 is an exploded view of the baked goods vessel of FIG. 1.

FIGS. 1-2 illustrate a baking vessel 100 according to a first exemplary embodiment. In the illustrated embodiment, the baking vessel 100 is a cupcake pan suitable for baking twelve cupcakes or muffins. In other embodiments, the baking vessel 100 may be configured to bake fewer or more cupcakes or muffins, and/or may be configured to bake cupcakes or muffins of different shapes and sizes. In exemplary embodiments an array including arrangement to have other than three rows may be utilized. In still other embodiments, the baking vessel 100 may be a pan suitable for baking other types of baked goods such as, for example, cakes, pie shells, breads, brownies, muffins, quiche, or the like. As illustrated in FIG. 1, the baking vessel is, in this embodiment, configured to be received on a surface, such as a wire rack 62, within an oven or similar baking apparatus to bake the cupcakes, muffins, or the like.

In illustrative embodiments, and as shown in FIG. 2, the baking vessel 100 includes a lower tray 10, one or more batter cups 22 configured to be received by the lower tray 10, a spacer tray 26, a middle tray 32, one or more cavity cups 44 configured to be received by the middle tray 32, and an upper tray 47. As illustrated in FIGS. 1-2, the upper tray 47 and middle tray 32 are configured to be nestingly received on top of the lower tray 10, and are further configured to retain the spacer tray 26, batter cups 22 and cavity cups 44 between the lower tray 10 and the upper tray 47, as discussed in more detail below. In illustrative embodiments, the baking vessel 100 may further include optional filling plugs 58 that are received on top of the upper tray 47 to engage with the cavity cups 44.

Figure 5:
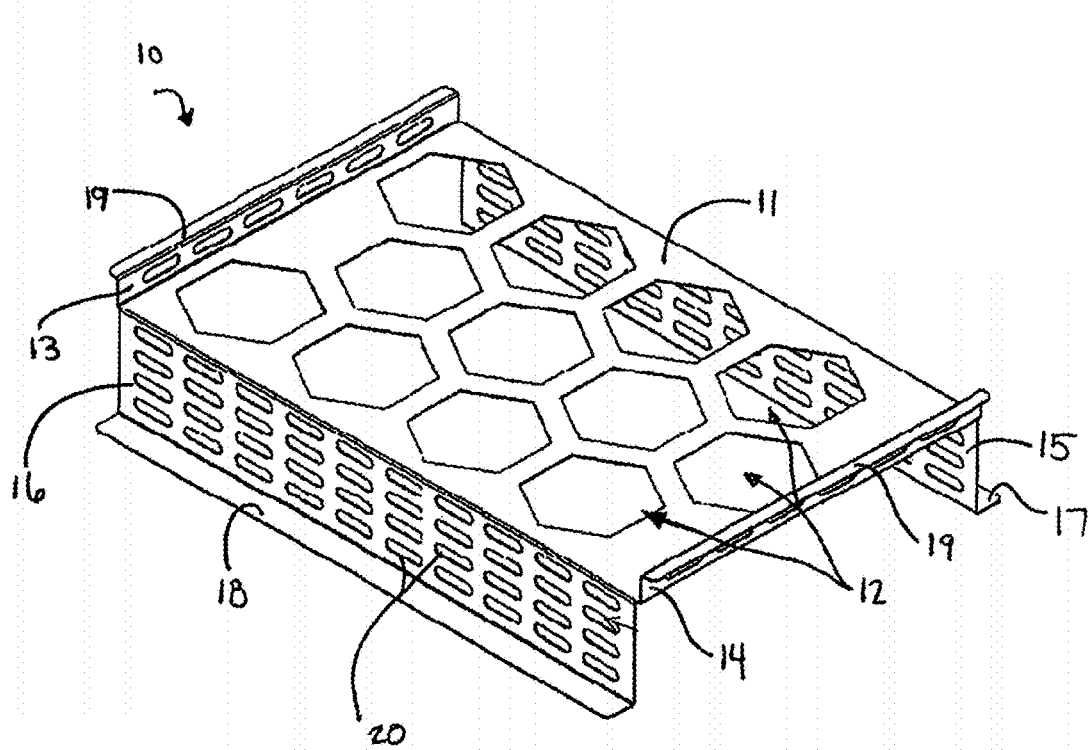
FIG. 5 is a perspective view of a lower tray of the baked goods vessel of FIG. 1.

Illustrative embodiments of the lower tray 10 will now be described. As illustrated in FIGS. 2 and 5, lower tray 10 includes a tray body 11, a first lower rail 15 and a second lower rail 16. The tray body 11 extends between the first lower rail 15 and the second lower rail 16. The first lower rail 15 and the second lower rail 16 are generally perpendicular to the tray body 11 and coupled to opposing side edges of the tray body 11. The first and second lower rails 15 and 16 are configured to extend downward toward a surface (such as, but not limited to, a rack or shelf, for example wire rack 62) on which the baking vessel 100 is retained or supported.

In illustrative embodiments, the first lower rail 15 (also referred to as a leg) includes a rail lip or flange 17 and the second lower rail 16 includes a rail lip or flange 18, as illustrated in FIG. 5. The flanges 17 and 18 each form a foot to provide additional surface area support for the baking vessel 100 while it is retained on a surface such as a rack. The flanges 17 and 18 may extend in a direction generally away from the tray body 11 and be generally parallel to the tray body 11. In illustrative embodiments, lower tray 10 further includes a front upper rail 13 and a back upper rail 14 coupled to respective front and back edges of the tray body 11. The upper rails 13 and 14 generally extend in a direction opposite of the lower rails 15 and 16. In illustrative embodiments, upper rails 13 and 14 further include stabilizing flanges 19. Stabilizing flanges 19 are configured to provide a supportive surface for portions of the middle tray 32 and upper tray 47 to abut against when the middle tray 32 and upper tray 47 are nested to the lower tray 10.

In illustrative embodiments, the lower tray 10 (as well as the other trays described herein) may be composed of steel, aluminum or other metal. In exemplary embodiments the trays may be made of other suitable heat-tolerant inert material that is sufficiently rigid to support the weight of the batter. Each tray described herein may be formed of the same material, or, in exemplary embodiments, a different material may be used for each tray. In exemplary embodiments, the batter cup 22 and/or the cavity cup 44 and/or the cupcake plug 58 may be removable or may be fixedly attached to the respective tray or may be formed as part of the tray, such as, but not limited to, by "deep draw" or stamped manufacturing techniques know to those skilled in the art. In exemplary embodiments, the batter cup 22 and/or the cavity cup 44 and/or the cupcake plug 58 may be made of the same material or materials as described hereinabove with respect to the trays, or may be made of a different material. In exemplary embodiments, the batter cup 22 and/or the cavity cup 44 and/or the cupcake plug 58 may be permanently associated with the respective tray, or may be removably associated with the respective tray.

In exemplary embodiments, one or more ventilation holes 20 may extend within lower rails 15 and 16 and/or upper rails 13 and 14 of the lower tray 10. The ventilation holes 20 are configured to permit air flow in and around the baking vessel 100, and more particularly around the batter cups 22, during the baking process. Ventilation holes 20 may be of various shapes and sizes, and may be positioned in a variety of manners within the lower rails 15 and 16 and upper rails 13 and 14. Alternatively, the ventilation holes 20 may be slots, vents, mesh, or other structure or configuration which permits airflow. In one exemplary embodiment, ventilation holes 20 may be positioned in rows.

The tray body 11 is formed to include one or more cutouts 12, as illustrated in FIG. 5. The cutouts 12 may be positioned along the surface of the tray body 11, and are each sized to receive a batter cup 22, as described below. The cutouts 12 may be of various sizes and shapes, depending on the desired final shape of the baked good. In various embodiments, the cutouts 12 may be arranged to maximize the plurality of cutouts 12 within fixed dimensions of the tray body 11 while still permitting circulation around the batter cups 22 to permit adequate heating and cooling of the baked goods.

Figure 6:
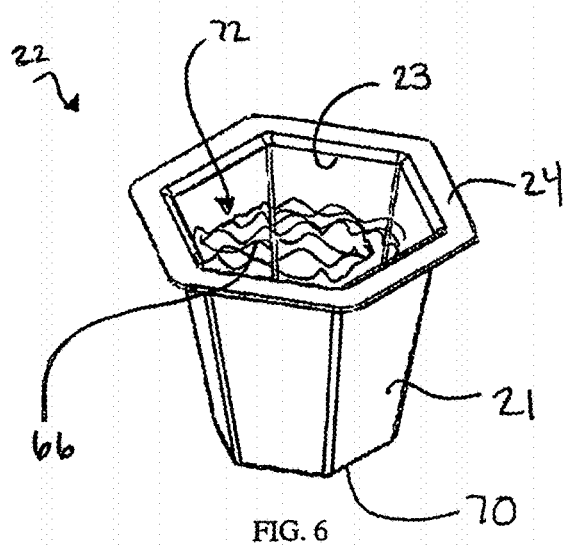
FIG. 6 is a perspective view of a batter cup of the baked goods vessel of FIG. 1.

Exemplary embodiments of the batter cup 22 will now be described. As illustrated in FIG. 6, a batter cup 22 includes at least a body 21 with a circumferential upper edge 23 defining the top of the batter cup 22 and a base 70. The batter cup 22 is formed to include a cavity 72 defined by the body 21 and the base 70 to receive batter 66. It is to be understood that the term "batter" is meant to include batter, dough, pre-baked mixtures, and the like. An outwardly extending rim 24 is coupled to the body 21 along the upper edge 23, and generally extends away from the body 21 in a direction that may be, in exemplary embodiments, generally perpendicular to the body 21. Various shapes and sizes of the batter cup 22 are envisioned (such as, but not limited to, pentagonal, square, triangular, octagonal, star-shaped, or other shape), and the circumferential upper edge 23 and rim 24 may be, for example, similar or complementary in shape to the shape and size of the batter cup 22. In illustrative embodiments, the body 21 and the cavity 72 formed by the body 21 may be shaped similar to a hexagon, as illustrated in FIG. 6. In some embodiments, the cavity 72 may be shaped as other shapes and/or sizes relative to the desired final shape of the baked good. For example, the batter cup 22 may include semi-spherical cavities that are defined by semi-spherically-shaped bottom surfaces. As the purpose of the rim 24 is to allow the batter cup 21 to be retained in the cutout 12, various configurations of the rim 24 are contemplated. In exemplary embodiments, the rim 24 may be, rather than a solid continuous rim, one or more tabs, fingers, bumps, hooks, bristles, or other types of protrusions extending from the upper edge 23 that can be supported by the tray body 11 when a batter cup 22 is inserted in a cutout 12.

In illustrative embodiments, the circumferential upper edge 23 is shaped to have a circumference that has a diameter that is equal to or less than the diameter of the cutouts 12 of the tray body 11, while the circumference of the rim 24 is shaped to have a diameter that is greater than the diameter of the cutouts 12 of the tray body 11. Accordingly, as illustrated in FIGS. 3-4, the batter cup 22 is received within the cutout 12 and is configured to slide downward (via, for instance, gravitation forces) within the cutout 12 until the rim 24 of the batter cup 22 engages with and abuts against the surface of the tray body 11, thereby retaining the batter cup 22 within the cutout 12. In such a way, the circumferential shape of the body 21 of the batter cup 22 may mirror or be complementary with the circumferential shape of the cutout 12. Similarly, the circumferential shape of the rim 24 of the batter cup 22 may also be similar or complementary to the shape of the body 21 of the batter cup 22.

The batter cup 22 may be composed of any of various materials depending on the desired baking characteristics or features of the desired baked good. In illustrative embodiments, the batter cup 22 may be composed of steel, similar to the lower tray 10 and other components of the baking vessel 100. In other embodiments, the batter cup 22 may be made of ceramic, clay or other material. In other embodiments, the batter cup 22 may be a different shape and/or may be composed of other materials that are different than the other components of the baking vessel 100. In some embodiments, an inside surface of the body 21 of the batter cup 22, as well as an inside surface of the base 70, may be coated or impregnated with a non-stick coating to inhibit baked goods from sticking to the batter cup 22 during baking.

The body 21 and the base 70 of the batter cup 22 are configured to receive batter 66 for baking, for example, cupcakes, muffins, or the like, within the cavity 72. The body 21, base 70, and rim 24 of the batter cup 22 may be manufactured separately and permanently welded, brazed, or otherwise secured to together. In other embodiments, the body 21, base 70, and rim 24 may be integrally formed as a single piece batter cup 22. During use, if desired, a cupcake liner (not shown) may be positioned within each batter cup 22. The baking vessel 100 may alternatively be used without liners.

Figure 7:
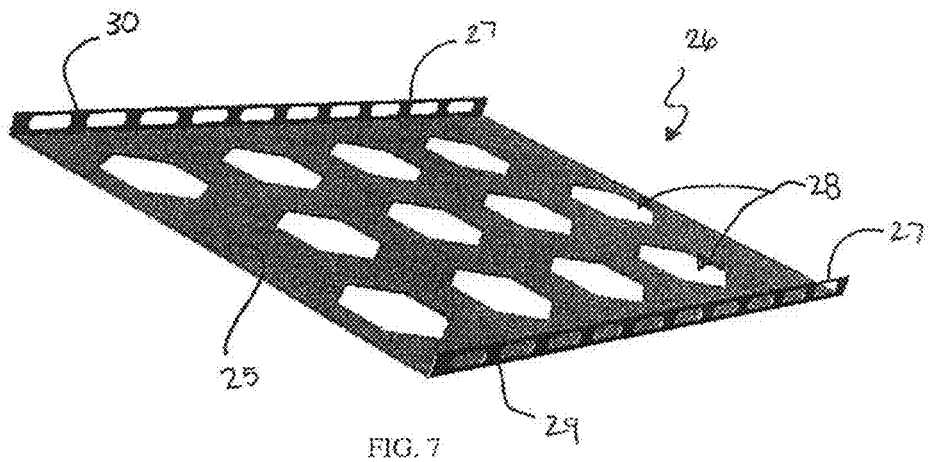
FIG. 7 is a perspective view of a spacer tray of the baked goods vessel of FIG. 1.

Illustrative embodiments of the spacer tray 26 will now be described. As illustrated in FIGS. 2 and 7, spacer tray 26 includes a tray body 25, a first upper rail 29 and a second upper rail 30. The tray body 25 extends between the first upper rail 29 and the second upper rail 30. The first upper rail 29 and the second upper rail 30 generally extend perpendicularly to the tray body 25 and coupled to opposing side edges of the tray body 11. The first and second upper rails 29 and 30 are configured to extend upward away from the tray body 11 of the lower tray 10 when the lower tray 10 and spacer tray 26 are assembled together in the baking vessel 100. In illustrative embodiments, the first upper rail 29 and second upper rail 30 extend a distance D above the tray body 25 and terminate at an abutment edge 27. In illustrative embodiments, one or more ventilation holes 20, as discussed above, may extend within upper rails 29 and 30.

The spacer tray 26 is configured to hold the batter cup 22 within the lower tray 10 in a suitable or stable position during baking. The spacer tray 26 sandwiches the cups 22 together with the lower tray 10 so to produce even cake thickness on the walls and floor of the baked good, particularly when the cavity cup 44, described below, is inserted into the batter cup 22.

The tray body 25 of the spacer tray 26 is formed to include one or more cutouts 28, as illustrated in FIG. 7. The cutouts 28 may be positioned along the surface of the tray body 25 and may be generally positioned to align with the cutouts 12 of the lower tray 10 such that the cutouts 28 of the spacer tray 26 will be positioned above the cavities 72 of the batter cups 22 received in the cutouts 12 of the lower tray 10 when the spacer tray 26 is positioned adjacent the lower tray 10 with the rim 24 of the batter cups 22 therebetween. The cutouts 28 may be of various sizes and shapes, depending on the desired final shape of the baked good. In various embodiments, and as illustrated in FIGS. 3-4, the cutouts 28 are configured to have a circumference that has a diameter that is less than the diameter of the cutouts 12 of the lower tray 10 or the circumferential upper edge 23 of the batter cups 22. In such a configuration, a portion of the spacer tray 26 will act as an upper barrier for batter 66 retained within batter cups 22, as illustrated in FIG. 4.

Figure 8:
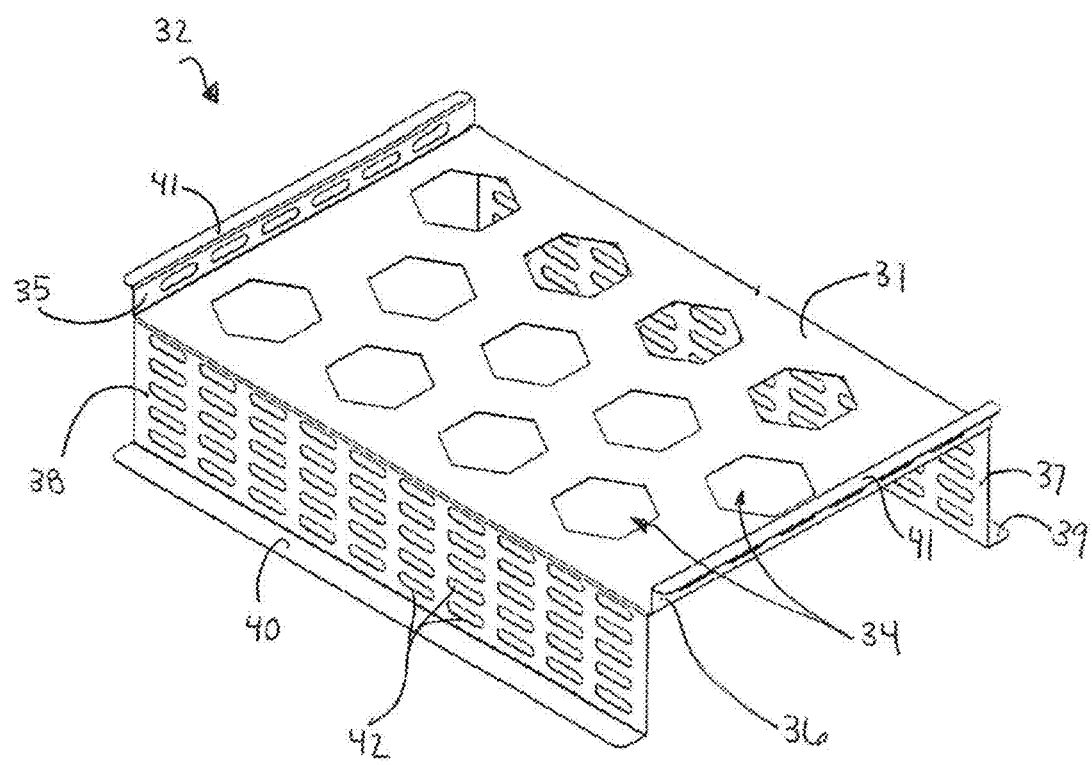
FIG. 8 is a perspective view of a middle tray of the baked goods vessel of FIG. 1.

Illustrative embodiments of the middle tray 32 will now be described. As illustrated in FIGS. 2 and 8, middle tray 32 includes a tray body 31, a first lower rail 37 and a second lower rail 38. The tray body 31 extends between the first lower rail 37 and the second lower rail 38. In illustrative embodiments, the tray body 31 may be slightly wider than the tray body 11 of the lower tray 10 to permit the first lower rail 37 of the middle tray 32 to nest over the first lower rail 15 of the lower tray 10 and the second lower rail 38 of the middle tray 32 to nest over the second lower rail 16 of the lower tray 10. The first lower rail 37 and the second lower rail 38 are generally perpendicular to the tray body 31 and coupled to opposing side edges of the tray body 31. The first and second lower rails 37 and 38 are configured to extend downward toward a surface (such as, but not limited to, a rack or shelf, for example wire rack 62) on which the baking vessel 100 is retained. In illustrative embodiments, the first lower rail 37 includes a rail lip or flange 39 and the second lower rail 38 includes a rail lip or flange 40, as illustrated in FIG. 8. The flanges 39 and 40 provide surface area support for the middle tray 32 to abut against the flanges 17 and 18 of the lower tray 10 when the middle tray 32 is nested with the lower tray 10 to form the baking vessel 100. The flanges 39 and 40 may extend in a direction generally away from the tray body 31 and be generally parallel to the tray body 31. In illustrative embodiments, middle tray 32 further includes a front upper rail 35 and a back upper rail 36 coupled to a front and back edges of the tray body 31. The upper rails 35 and 36 generally extend in a direction opposite of the lower rails 37 and 38. In illustrative embodiments, upper rails 35 and 36 further include stabilizing flanges 41. Stabilizing flanges 41 are configured to provide a supportive surface for portions of the upper tray 47 to abut against when the middle tray 32 and upper tray 47 are nested together. In illustrative embodiments, the middle tray 32 may be composed of a generally rigid material, and may be of a material similar to the lower tray 10, such as, but not limited to, steel.

In illustrative embodiments, one or more ventilation holes 42 may extend within lower rails 37 and 38 and/or upper rails 35 and 36 of the middle tray 32. The ventilation holes 42 are configured to permit air flow in and around the baking vessel 100, and more particularly around the batter cup 22, during the baking process. Ventilation holes 42 may be of various shapes and sizes, and may be of similar size, dimension and positioning as described with respect to ventilation holes 20 of lower tray 10. In illustrative embodiments, ventilation holes 42 are positioned to be aligned with ventilation holes 20 when middle tray 32 is nested with lower tray 10 in the baking vessel 100.

The tray body 31 is formed to include one or more cutouts 34, as illustrated in FIG. 8. The cutouts 34 may be positioned along the surface of the tray body 31, and are each sized to receive a cavity cup 44, as described below. The cutouts 34 may be of various sizes and shapes, depending on the desired final shape of the baked good. The cutouts 34 may be generally positioned to align with the cutouts 12 of the lower tray 10, as well as the cutouts 28 of the spacer tray 26, such that the cutouts 34 of the middle tray 32 will be positioned above the cavities 72 of the batter cups 22 received in the cutouts 12 of the lower tray 10 when the middle tray 32 is positioned above and nested with the spacer tray 26 and the lower tray 10 in the baking vessel 100. In various embodiments, and as illustrated in FIGS. 3-4, the cutouts 34 are configured to have a circumference that has a diameter that is greater than the diameter of the cutouts 28 of the spacer tray 26, but less than the diameter of the cutouts 12 of the lower tray 10.

When assembling the middle tray 32 with the lower tray 10 and spacer tray 26, the tray body 31 of the middle tray will abut against the abutment edge 27 of the upper rails 29 and 30 of the spacer tray 26. As illustrated in FIGS. 3-4, this abutment will create a gap 74 between the tray body 31 of the middle tray 32 and the tray body 25 of the spacer tray 26.

Illustrative embodiments of the cavity cup 44 will now be described. As illustrated in FIG. 9, one exemplary embodiment of a cavity cup 44 includes at least a body 43 with a circumferential upper edge 45 defining the top of the cavity cup 44 and a base 78. The cavity cup 44 is formed to include a cavity 80 defined by the body 43 and the base 78. The body 43 is configured to be received within the cavity 72 of the batter cup 22, and the body 43 includes an exterior surface 79 that is configured to from a barrier for batter 66 received within the batter cup 22 to shape the batter 66 as it bakes. Accordingly, the cavity cup 44 is configured to form a filling recess within a baked good. The body 43 of the cavity cup 44 will generally have a circumference with a diameter that is less than the diameter of the batter cup 22, and may be determined based on the desired size of the hole or recess for filling within the baked good. In illustrative embodiments, the diameter of the cavity cup 44 may be half the diameter of the batter cup 22. Other relational sizes of the cavity cup 44 to the batter cup 22 are further envisioned within the scope of this disclosure.

An outwardly extending rim 46 is coupled to the body 43 along the upper edge 45, and generally extends away from the body 43 in a direction that is generally perpendicular to the body 43. Various shapes and sizes of the cavity cup 44 are envisioned here, and the circumferential upper edge 45 and rim 46 may be, for example, similar or complementary in shape or construction to the shape and size of the batter cup 22. In illustrative embodiments, the body 43 and the cavity 80 formed by the body 43 may be shaped similar to a hexagon, as illustrated in FIG. 9. In various embodiments, the cavity 80 may be shaped as other shapes and/or sizes relative to the desired final shape of the filling recess within the baked good. For example, the cavity cup 44 may include semi-spherical cavities that are defined by semi-spherically-shaped bottom surfaces.

In illustrative embodiments, the circumferential upper edge 45 is shaped to have a circumference that is equal to or less than the circumference of the cutouts 34 of the tray body 31 of the middle tray 32, while the circumference of the rim 46 is shaped to be greater than the circumference of the cutouts 34 of the tray body 31. Accordingly, as illustrated in FIGS. 3-4, the cavity cup 44 is received within the cutout 34 and is configured to slide downward (via, for instance, gravitation forces) within the cutout 34 until the rim 46 of the cavity cup 44 engages with and abuts against the surface of the tray body 31 of the middle tray 32, thereby retaining the cavity cup 44 within the cutout 34. In such a way, the circumferential shape of the body 43 of the cavity cup 44 may mirror or be complementary with the circumferential shape of the cutout 34. Similarly, the circumferential shape of the rim 46 of the cavity cup 44 may also be similar or complementary to the shape of the body 43 of the cavity cup 44.

The cavity cup 44 may be composed of various materials depending on the desired baking characteristics or features or the desired baked good. In illustrative embodiments, the cavity cup 44 may be composed of steel, similar to the batter cup 22 and other components of the baking vessel 100. In other embodiments, the cavity cup 44 may be a different shape and/or may be composed of other materials that are different than the other components of the baking vessel 100. In some embodiments, the exterior surface 79 of the body 43 of the cavity cup 44, as well as an exterior surface of the base 78, may be coated or impregnated with a non-stick coating to inhibit baked goods from sticking to the cavity cup 44 during baking.

The body 43 and the base 78 of the cavity cup 44 are configured to abut against batter 66 for baking a filling recess or hole into, for example, cupcakes, muffins, or the like. The body 43, base 78, and rim 46 of the cavity cup 44 may be manufactured separately and permanently welded, brazed, or otherwise secured to together. In other embodiments, the body 43, base 78, and rim 46 may be integrally formed as a single piece cavity cup 44.

As noted above, the cavity cup 44 is configured to form a filling recess within the baked good. The filling recess may support a variety of filling materials within the baked good, for example fruit (such as, but not limited to, cherries, strawberries, apple pieces, raspberries, or the like), candies or creams (such as, but not limited to, whipped cream, chocolates, marshmallows, gummy worms, gumballs, or the like), nuts (such as, but not limited to, walnuts, almonds, cashews, or the like), or the like. Other types of fillings are envisioned within the scope of this disclosure. In various embodiments, the cavity cup 44 is formed such that the walls and floors of a baked good 60 have the same amount of cake (cake thickness), or a uniform cross-sectional thickness at the walls and sides of the baked good 60.

Illustrative embodiments of the upper tray 47 will now be described. As illustrated in FIGS. 2 and 10, upper tray 47 includes a tray body 61, a first lower rail 51 and a second lower rail 52. The tray body 61 extends between the first lower rail 51 and the second lower rail 52. In illustrative embodiments, the tray body 61 may be slightly wider than the tray body 31 of the middle tray 32 to permit the first lower rail 51 of the upper tray 47 to nest over the first lower rail 37 of the middle tray 32 and the second lower rail 52 of the upper tray 47 to nest over the second lower rail 38 of the middle tray 32. The first lower rail 51 and the second lower rail 52 are generally perpendicular to the tray body 61 and coupled to opposing side edges of the tray body 61. The first and second lower rails 51 and 52 are configured to extend downward toward a surface (e.g., a rack) on which the baking vessel 100 is retained. In illustrative embodiments, the first lower rail 51 includes a rail lip or flange 53 and the second lower rail 52 includes a rail lip or flange 54, as illustrated in FIG. 10. The flanges 53 and 54 provide surface area support for the upper tray 47 to abut against the flanges 39 and 40 of the middle tray 32 when the upper tray 47 is nested with the middle tray 32 in the baking vessel 100. The flanges 53 and 54 may extend in a direction generally away from the tray body 61 and be generally parallel to the tray body 61. In illustrative embodiments, upper tray 47 further includes a front upper rail 49 and a back upper rail 50 coupled to a front and back edges of the tray body 61. The upper rails 49 and 50 generally extend in a direction opposite of the lower rails 51 and 52. In illustrative embodiments, upper rails 49 and 50 further include stabilizing flanges 55. Stabilizing flanges 55 are configured to provide to abut against the stabilizing flanges 41 of the middle tray 32 to provide a supportive surface when the middle tray 32 and upper tray 47 are nested together. In illustrative embodiments, the upper tray 47 may be composed of steel or other material similar to the middle tray 32 or lower tray 10.

In illustrative embodiments, one or more ventilation holes 56 may extend within lower rails 51 and 52 and/or upper rails 49 and 50 of the upper tray 47. The ventilation holes 56 are configured to permit air flow in and around the baking vessel 100, and more particularly around the batter cup 22, during the baking process. Ventilation holes 56 may be of various shapes and sizes, and may be of similar size, dimension or positioning as ventilation holes 20 of lower tray 10 and ventilation holes 42 of middle tray 32. In illustrative embodiments, ventilation holes 56 are positioned to be aligned with ventilation holes 20 and 42 when upper tray 47 is nested with middle tray 32 and lower tray 10 in the baking vessel 100.

The tray body 61 is formed to include one or more cutouts 48, as illustrated in FIG. 10. The cutouts 48 may be positioned along the surface of the tray body 61, and are each sized to receive an optional plug 58, as described below. The cutouts 48 may be of various sizes and shapes, depending on the desired final shape of the top of the baked good. The cutouts 48 may be generally positioned to align with the cutouts 34 of the middle tray 32 and the cutouts 12 of the lower tray 10, as well as the cutouts 28 of the spacer tray 26, such that the cutouts 48 of the upper tray 47 will be positioned above the cavities 72 of the batter cups 22 and the cavities 80 of the cavity cups 44. In various embodiments, and as illustrated in FIGS. 3-4, the cutouts 48 are configured to have a circumference that has a diameter is generally equal to the diameter of the cutouts 34 of the middle tray 32, but less than the diameter of the cutouts 12 of the lower tray 10.

When assembling the upper tray 47 with the middle tray 32, the lower tray 10, and the spacer tray 26, the tray body 61 of the upper tray 47 will abut against an upper surface of the tray body 31 of the middle tray 32. Similarly, a lower surface of the flanges 53 and 54 of the upper tray 47 may abut against an upper surface of the flanges 39 and 40 of the middle tray 32.

Illustrative embodiments of the optional plug 58 will now be described. As illustrated in FIG. 11, the optional plug 58 includes at least a body 57 with a circumferential upper edge 59 defining the top of the optional plug 58 and a base 84. The plug 58 is formed to include a cavity 86 defined by the body 57 and the base 84. The body 57 is configured to be received within the cavity 86 of the cavity cup 44 during baking. The cavity 86 of the plug 58 provides a defined location for batter 66 to be received within the plug 58 in order to form an optional baked-good-topper for the baked good to be received over the filling recess when the baked good is assembled.

An outwardly extending rim 60 is coupled to the body 57 along the upper edge 59, and generally extends away from the body 57 in a direction that is generally perpendicular to the body 57. Various shapes and sizes of the plug 58 are envisioned here, and the circumferential upper edge 59 and rim 60 may be, for example, similar or complementary in shape to the construction, shape and size of the plug 58. In illustrative embodiments, the body 57 and the cavity 86 formed by the body 57 may be shaped similar to a hexagon, as illustrated in FIG. 11. In some embodiments, the cavity 86 may be shaped as other shapes and/or sizes relative to the desired final shape of the filling recess within the baked good. For example, the plug 58 may include semi-spherical cavities that are defined by semi-spherically-shaped bottom surfaces.

In illustrative embodiments, the circumferential upper edge 59 is shaped to have a circumference that has a diameter that is equal to or less than the diameter of the cutouts 48 of the tray body 61 of the upper tray 47, while the circumference of the rim 60 is shaped to have a diameter that is greater than the diameter of the cutouts 48 of the tray body 61. Accordingly, as illustrated in FIGS. 3-4, the plug 58 is received within the cutout 48 and is configured to slide downward (via, for instance, gravitation forces) within the cutout 58 until the rim 60 of the plug 58 engages with and abuts against the surface of the tray body 61 of the upper tray 47, thereby retaining the plug 58 within the cutout 48. In such a way, the circumferential shape of the body 57 of the plug 58 may mirror or be complementary with the circumferential shape of the cutout 48. Similarly, the circumferential shape of the rim 60 of the plug 58 may also be similar or complementary to the shape of the body 57 of the plug 58.

The plug 58 may be composed of any of a variety materials depending on the desired baking characteristics or features or the desired baked good. In illustrative embodiments, the plug 58 may be composed of steel, similar to the cavity cup 44 or batter cup 22 and other components of the baking vessel 100. In other embodiments, the plug 58 may be a different shape and/or may be composed of other materials that are different than the other components of the baking vessel 100. In some embodiments, an interior surface 81 of the body 57 of the plug 58, as well as an interior surface of the base 84, may be coated with a non-stick coating to inhibit baked goods from sticking to the plug 58 during baking.

In illustrative embodiments, the body 57 and the base 84 of the plug 58 are configured to receive batter for baking a topper for a filling recess or hole in, for example, cupcakes, muffins, or the like. Specifically, the plug 58 is formed to receive batter (illustratively within the cavity 86 defined by the interior surface 81) and form a topper that will cover a filling hole formed in a baked good. The topper may be baked from batter that is the same as, or different from, the batter used to create the baked good. The body 57, base 84, and rim 60 of the plug 58 may be manufactured separately and permanently welded, brazed, or otherwise secured together. In other embodiments, the body 57, base 84, and rim 60 may be integrally formed as a single piece plug 58. In alternative embodiments, a spring-form-type may be used.

Figure 12A:
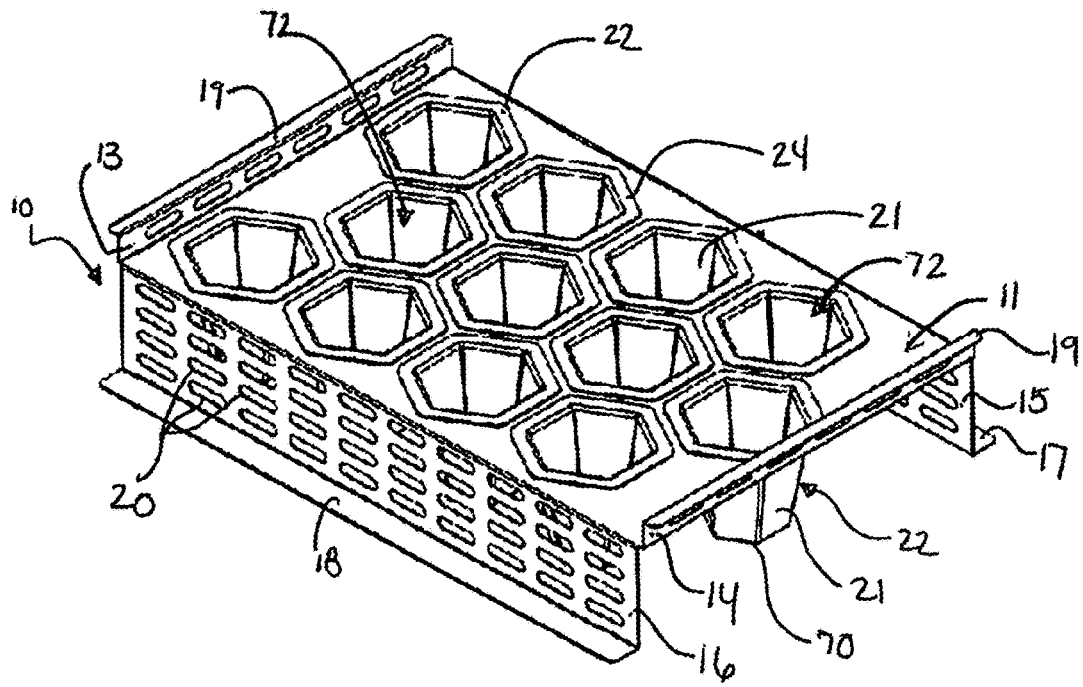
Figure 12B:
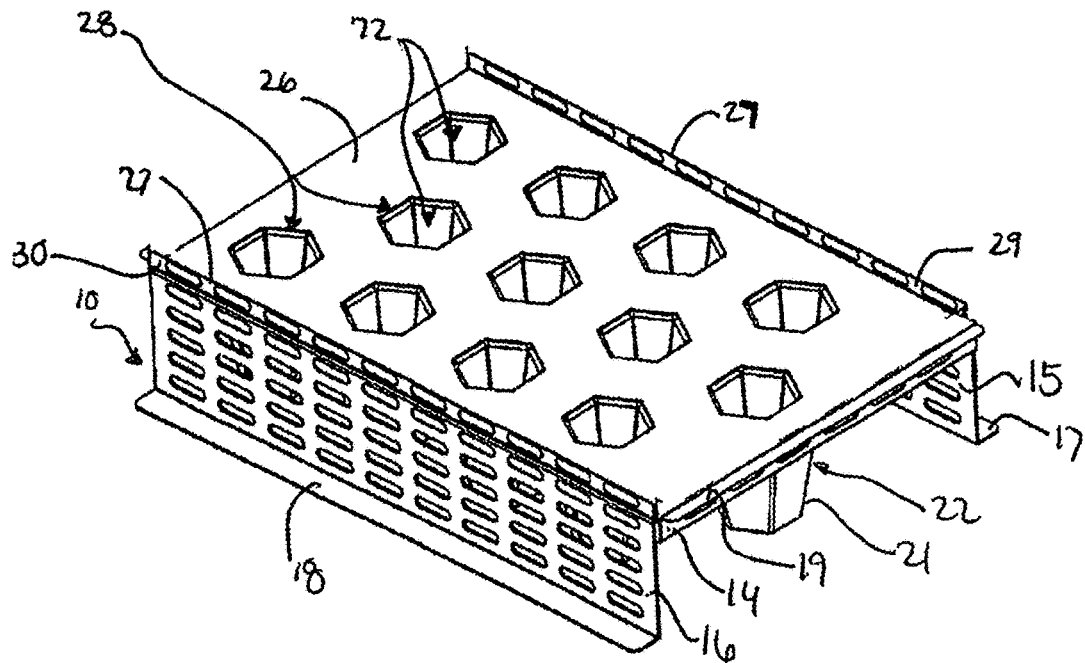
Figure 12C:
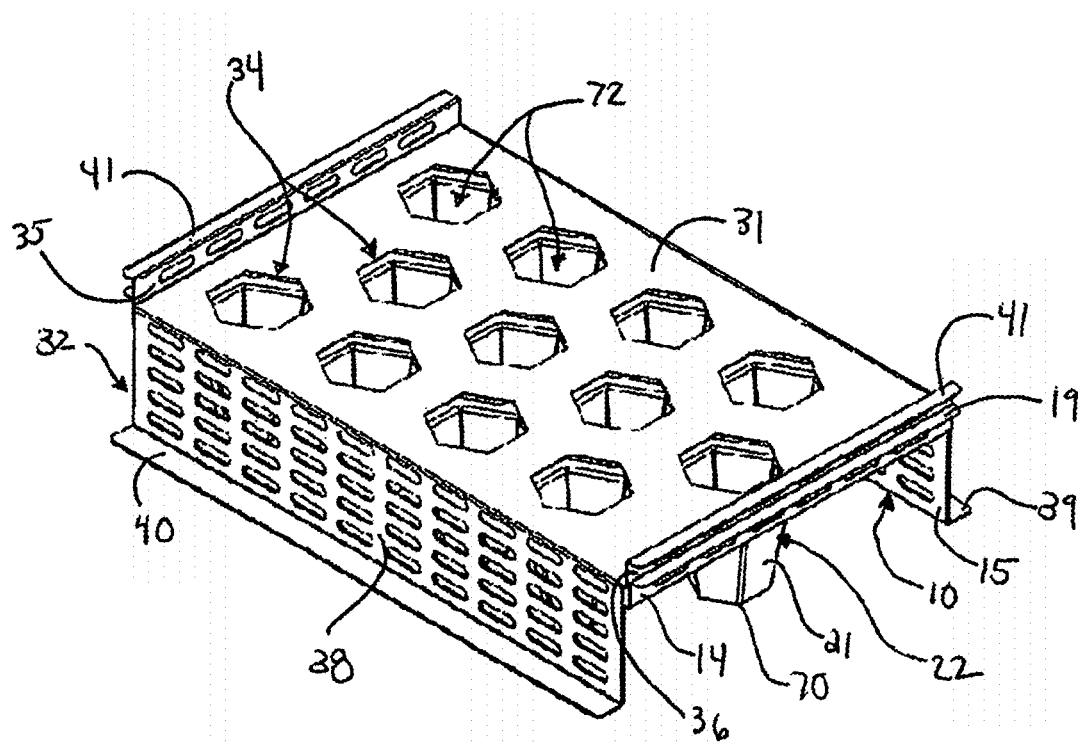
Figure 12D:
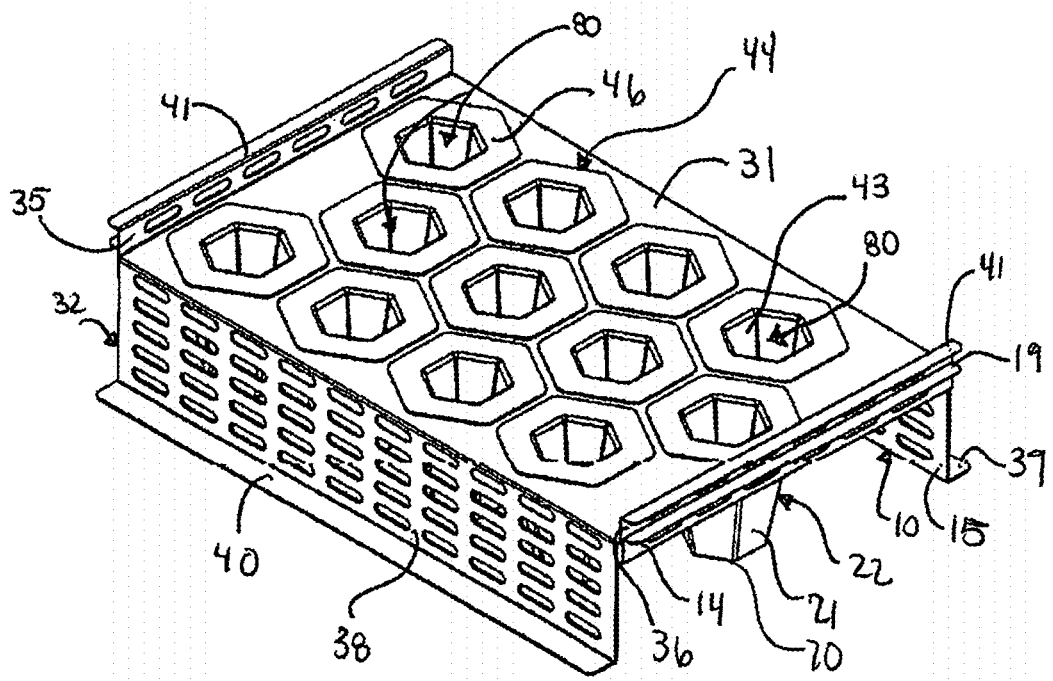
Figure 12E:
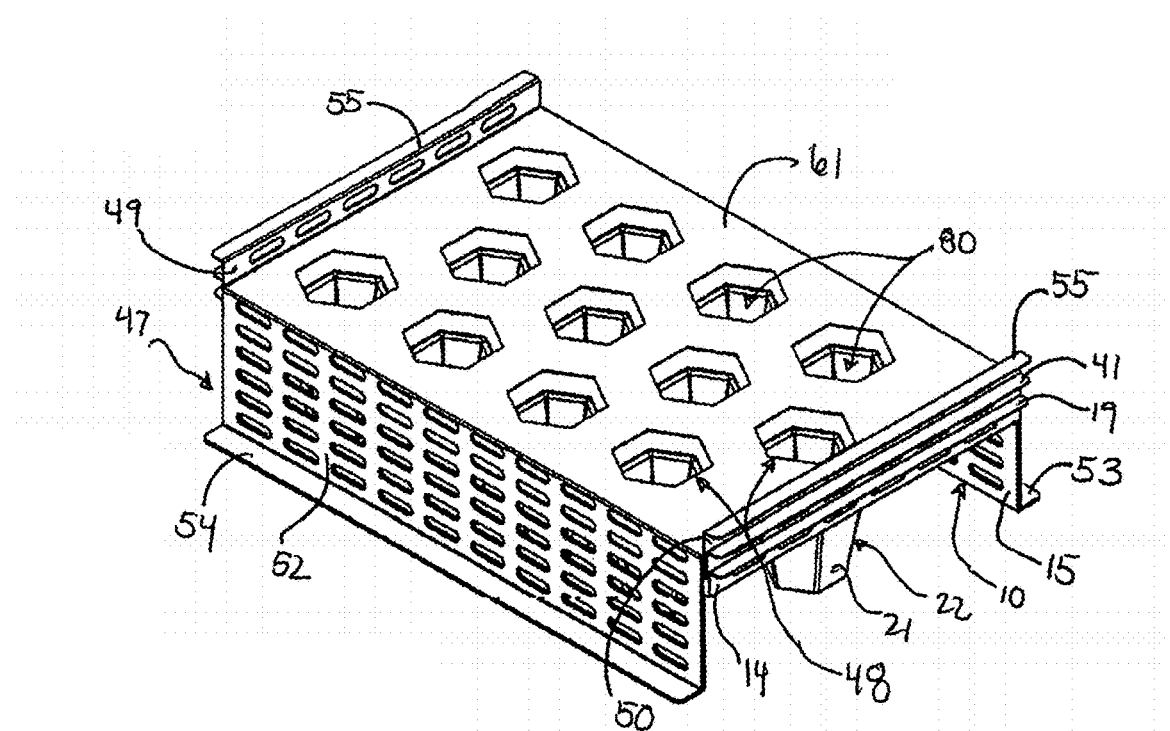
Figure 12F:
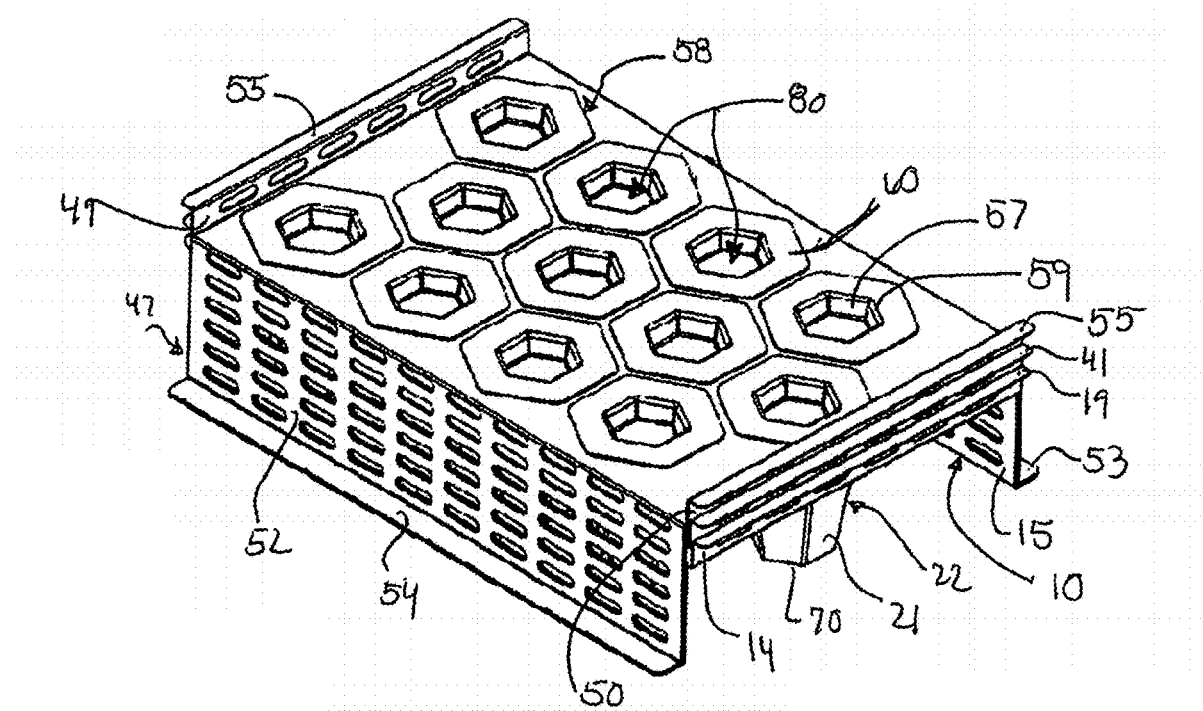

An exemplary embodiment of a process of assembling a baked goods vessel 100 is illustrated in FIGS. 12A-12F. As illustrated in FIG. 12A, one or more batter cups 22 are received within one or more cutouts 12 of the lower tray 10. The rim 24 of a batter cup 22 abuts against the tray body 11 to retain the batter cup 22 within the cutout 12. After the batter cup 22 is received within the cutout 12 of the lower tray 10, batter 66 may be placed within the cavity 72 of the batter cup 22. As illustrated in FIG. 12B, the spacer tray 26 is placed on top of lower tray 10. The spacer tray 26 is positioned such that the tray body 25 of the spacer tray 26 is adjacent to the tray body 11 of the lower tray 10, and the cutouts 28 of the spacer tray 26 are above the batter cups 22 within the cutouts 12 of the lower tray 10. The upper rails 29 and 30 of the spacer tray are positioned to upwards and away from the lower tray 10. In illustrative embodiments, the cutouts 28 of the spacer tray 26 may have a smaller diameter than the cutouts 12 of the lower tray 10 and further may have a smaller diameter than the cavity 72 of the batter cup 22. As illustrated in FIG. 12C, the middle tray 32 is nested over the spacer tray 26 such that the body 31 of the middle tray 32 is positioned over the body 25 of the spacer tray 26. The body 31 of the middle tray 32 is spaced apart from the body 25 of the spacer tray 26 because the body 31 of the middle tray 32 abuts against the upper rails 29 and 30 of the spacer tray 26. The lower rails 37 and 38 of the middle tray 32 are positioned to abut against an outside surface of the lower rails 15 and 16 of the lower tray 10 in the nested arrangement. When middle tray 32 is nested on top of spacer tray 26 and lower tray 10, cutouts 34 of the middle tray 32 will be in general alignment with cutouts 28 of the spacer tray 26. As illustrated in FIG. 12D, one or more cavity cups 44 are received within the cutouts 34 of the middle tray 32. The rims 46 of the cavity cups 44 abut against the tray body 31 of the middle tray 32 to retain the cavity cup 44 within the cutouts 34. When the cavity cups 44 are received within the cutouts 34, an outside surface of the body 43 of the cavity cups 44 will deform and restrict movement of the batter 66 within the batter cups 22. As illustrated in FIG. 4, the cavity cups 44 will cause a void or depression to be formed within the batter 66, resulting in a baked good that has a similar void or depression to receive filling. As illustrated in FIG. 12E, the upper tray 47 is nested over the middle tray 32 such that the tray body 61 of the upper tray 47 is positioned over the body 31 of the middle tray 32. In illustrative embodiments, the tray body 61 of the upper tray 47 may rest on the rims 46 of the cavity cups 44 within the cutouts 34 of the middle tray 32. The lower rails 51 and 52 of the upper tray 47 are positioned to abut against an outside surface of the lower rails 37 and 38 of the middle tray 32 in the nested arrangement. When upper tray 47 is nested on top of middle tray 32, cutouts 48 of the upper tray 47 will be in general alignment with the cavity 80 of the cavity cup 44. As illustrated in FIG. 12F, an optional plug 58 may be received within the cutouts 48 of the upper tray 47. The rims 60 of the optional plug 58 are configured to abut against the tray body 61 of the upper tray 47 to retain the optional plug 58 within the cutouts 48.

The lower tray 10, middle tray 32 and upper tray 47 may be coupled together in a variety of ways in order for the baked good vessel 100 to be used to bake a baked good within an oven or other baking mechanism. In an exemplary embodiment, the trays 10, 32 and 47 are configured to nest together in such a way that no additional retainer is necessary. In other illustrative embodiments, the lower tray 10, middle tray 32 and upper tray 47 may be retained together via a retaining clamp or clip 64 that holds together the flanges 17 and 18 of the lower tray 10 with the flanges 39 and 40 of the middle tray 32 and the flanges 53 and 54 of the upper tray 47, as illustrated in FIG. 1. In illustrative embodiments, such as that shown in FIG. 1, three retaining clips 64 are arranged to retain together each of the flanges 17, 40, 54 and 18, 39, 53, but in some embodiments, any suitable number, type, and/or arrangement of clips, clamps, and/or other retaining means may be used. In exemplary embodiments, instead of clips or clamps, one or more sets of interlocking tabs and mating recesses or one or more sets of posts and mating apertures can be used. Two retaining clips 64 are illustratively arranged to retain together each of the corresponding stabilizing flanges 41, 55, but in some embodiments, any suitable number, type, and/or arrangement of clips, clamps, and/or other retaining means may be used. Other means for coupling the trays 10, 32 and 47 together are known in the art. The flanges 17, 18, 39, 40, 53 and 54 further provide stability for the baked goods vessel 100 on an oven rack 62 or other similar platform used for baking the baked goods.

The present disclosure is further directed to a baked good article and method of forming same that is prepared within the baked good vessel 100 disclosed herein. Specifically, a baked good may be formed by a method comprising preparing a suitable batter 66 and placing the batter 66 within the batter cup 22 that is retained by the lower tray 10. Specifically, the batter 66 may be placed in the cavity 72 of the batter cup 22 before or after the batter cup 22 is received within the cutout 12 of the lower tray 10. In illustrative embodiments, the body 43 of the cavity cup 44 is then placed within the cavity 72 of the batter cup 22. The body 43 forces the batter 66 into a predetermined shape, and particularly creates a void or recess within the baked good as the batter 66 is baked. After baking, the baked good is removed from the baked good vessel 100 and the void or recess is retained within the baked good. A filling material may then be inserted into the recess of the baked good formed by the cavity cup 44 to be retained by the walls of the baked good formed by the batter cup 22. In optional embodiments, additional batter 66 may be placed within the plug 58 to be baked with the batter 66 within the batter cup 22. The batter 66 within the plug 58 may form a topper or lid of baked good over the recess within the baked good based on the size and shape of the plug 58.

The article made with the apparatus and methods described herein may be a hollow or fillable shape that can be filled by a separate apparatus with any of a variety of flowable liquid, gelatinous, foam, or particulate material, or combination thereof. In exemplary embodiments, the article may be fitted with a cap or top to close or seal the article opening, such as after the article is filled.

In some exemplary embodiments, the spacer tray may be formed as a portion of one of the other components, for example but without limitation, the middle tray. In some embodiments, the upper tray may be optionally excluded, for example but without limitation, if the optional plug 58 is not applied.

It is to be understood that the invention and the embodiments hereinabove can be adapted to be used with non-food products, such as a shell or vessel of a material that is formed by heating. The material may be plastic, rubber, polymeric, composite, metal, cement, concrete, glass, or other material formable into a fillable vessel. The material feedstock may incorporate mold release materials, as are known to those skilled in the art.

Although only a plurality of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" and "illustrative" mean "an example of" and is not intended to convey an indication of a preferred or ideal embodiment. "Such as" is not used in a restrictive sense, but for explanatory purposes.

Disclosed are components that can be used to perform the disclosed methods, equipment and systems, and to form the disclosed articles of manufacture. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems.

It should further be noted that any patents, applications and publications referred to herein are incorporated by reference in their entirety.

The present disclosure may be better understood and advantages made apparent to those skilled in the art by referencing the accompanying drawings and schematics. The drawings are illustrative of example embodiments and are not intended to limit the scope of the invention.

Although certain illustrative embodiments have been described in detail above, variations and modifications exist within the scope and spirit of this disclosure as described and as defined in the following claims.

We claim:

1. A baking assembly for forming baked goods having a filling recess for receiving filling, the baking system comprising:
    (a) at least one batter cup including a body and a rim projecting from the body, the body having a cavity defined therein for receiving batter;
    (b) a base tray having at least one opening for receiving the body of the at least one batter cup;
    (c) at least one cavity cup including a cavity cup body arranged within the cavity of the batter cup and a flange projecting from the cavity cup body;
    (d) a cavity cup tray including at least one aperture adapted to receive the at least one cavity cup arranged within the cavity of the batter cup spaced apart from the body of the batter cup, the at least on aperture defining a batter space between the cavity cup body and the body of the batter cup, the cavity cup tray nestable above the base tray to align the at least one aperture with the at least one opening; and,
    (e) an upper tray including at least one opening, the upper tray abutting the cavity cup tray with alignment between the at least one opening and the at least one aperture of the cavity cup tray,
        wherein the rim of the at least one batter cup is adapted to engage the base tray to seat the at least one batter cup within the at least one opening of the base tray, and the flange of the cavity cup is adapted to engage the cavity cup tray to seat the at least one cavity cup within the at least one aperture of the cavity cup tray.

2. The baking assembly of claim 1, furthering comprising at least one plug each plug including a plug body and a plug flange extending from the plug body, the at least one plug arranged within the at least one opening of the upper tray to abut the plug flange with the upper tray.

3. The baking assembly of claim 2, wherein the plug body defines a plug cavity for receiving batter to form a topper to be received over the filling recess of baked goods, the plug cavity shaped complementary to the cavity cup body.

4. The baking assembly of claim 1, further comprising a spacer tray arranged between the base tray and the cavity cup tray to support the cavity cup tray spaced apart from the base tray to define a gap between a tray body of the base tray and a tray body of the cavity cup tray.

5. The baking assembly of claim 4, wherein the spacer tray includes a tray body that abuts the rim of the at least one cavity cup.

6. The baking assembly of claim 4, wherein the spacer tray includes at least one cutout aligned with the at least one opening of the base tray to receive the cavity cup.

7. The baking assembly of claim 6, wherein the spacer tray includes a tray body that extends at least partially radially between the batter cup and the cavity cup to define the at least one cutout and the tray body form a barrier for batter within batter cups.

8. The baking assembly of claim 1, wherein the base tray includes a tray body defining the at least one opening and at least two legs each extending generally downward from the tray body to form a foot for supporting the tray body above the feet.

9. The baking assembly of claim 8, wherein a flange extends from each foot to provide stability of the corresponding leg.

10. The baking assembly of claim 8, wherein the cavity cup tray includes a tray body defining the at least one aperture and at least two legs each extending generally downward from the tray body to form a foot for supporting the tray body above the feet.

11. The baking assembly of claim 10, wherein the feet of the cavity cup tray are adapted to engage with the base tray and support the tray body of the cavity cup tray spaced apart from the tray body of the base tray.

12. The baking assembly of claim 10, wherein the legs of the cavity cup tray extend over the legs of the base tray and are adapted to nest the cavity cup tray and the base tray together.

13. The baking assembly of claim 8, wherein the legs of the base tray include at least one vent opening defined therethrough for allowing air to flow at least partially around the batter cups.

14. The baking assembly of claim 13, wherein the cavity cup tray includes at least one vent opening defined therethrough, the at least one vent opening of the cavity cup tray arranged to correspond with the at least one vent opening of the base tray.

15. The baking assembly of claim 8, wherein the base tray includes at least two arms extending generally upward from the tray body to provide support for the cavity cup tray.

16. The baking assembly of claim 1, wherein each of the base tray and the cavity cup tray include a tray body and rails extending generally upward from the respective tray body, each of the rails including a flange that provides a support surface.

17. A method of assembling a baking assembly for forming baked goods having a filling recess for receiving filling, the method comprising:
(a) receiving at least one batter cup within at least one opening of a base tray such that a rim of the at least one batter cup abuts against a tray body of the base tray,
(b) depositing batter within a cavity of the at least one batter cup,
(c) mounting a cavity cup tray with the base tray such that at least one opening of the cavity cup tray is aligned with the cavity of the at least one batter cup and such that the tray body of the base tray is spaced apart from a tray body of the cavity cup tray,
(d) receiving at least one cavity cup within the at least one opening of the cavity cup tray and into the cavity of the batter cup such that a rim of the at least one batter cup abuts against the tray body of the cavity cup tray, and
(e) mounting an upper tray above the cavity cup tray.

18. The method of assembling a baking assembly of claim 17, wherein mounting the cavity cup tray with the base tray includes mounting lower rails of the cavity cup tray adapted to nest over lower rails of the base tray.

19. The method of assembling a baking assembly of claim 17, further comprising receiving at least one plug within a corresponding at least one opening of the upper tray.

20. The method of assembling a baking assembly of claim 17, further comprising mounting a spacer tray with the base tray to abut a rim of the at least one batter cup.

21. A method of baking a baked good having a filling recess for receiving filling, the method comprising:
(a) assembling a baking assembly, including:
   i. receiving at least one batter cup within at least one opening of a base tray such that a rim of the at least one batter cup abuts against a tray body of the base tray,
   ii. depositing batter within a cavity of the at least one batter cup,
   iii. mounting a cavity cup tray with the base tray such that at least one opening of the cavity cup tray is aligned with the cavity of the at least one batter cup and such that the tray body of the base tray is spaced apart from a tray body of the cavity cup tray,
   iv. receiving at least one cavity cup within the at least one opening of the cavity cup tray and into the cavity of the batter cup such that a rim of the at least one batter cup abuts against the tray body of the cavity cup tray, and
   v. mounting an upper tray above the cavity cup tray;
(b) heating the baking assembly to convert at least a portion of the batter at least partially into the baked good; and
(c) cooling at least a portion of the at least partially formed baked good.

\* \* \* \* \*